(12) United States Patent
Sung

(10) Patent No.: US 9,981,404 B2
(45) Date of Patent: May 29, 2018

(54) SAFETY FEEDER

(71) Applicant: Meng-I Sung, Taichung (TW)

(72) Inventor: Meng-I Sung, Taichung (TW)

( * ) Notice: Subject to any disclaimer, the term of this patent is extended or adjusted under 35 U.S.C. 154(b) by 367 days.

(21) Appl. No.: 14/802,009

(22) Filed: Jul. 17, 2015

(65) Prior Publication Data

US 2015/0321380 A1    Nov. 12, 2015

Related U.S. Application Data

(63) Continuation-in-part of application No. 14/289,696, filed on May 29, 2014.

(51) Int. Cl.
| | |
|---|---|
| *B27B 25/02* | (2006.01) |
| *B26D 7/06* | (2006.01) |
| *B27B 25/08* | (2006.01) |
| *B23D 47/04* | (2006.01) |
| *B23D 51/04* | (2006.01) |
| *B27B 5/29* | (2006.01) |
| *B23D 55/04* | (2006.01) |

(52) U.S. Cl.
CPC ............ *B27B 25/02* (2013.01); *B23D 47/045* (2013.01); *B23D 51/046* (2013.01); *B23D 55/046* (2013.01); *B26D 7/06* (2013.01); *B27B 5/29* (2013.01); *B27B 25/08* (2013.01)

(58) Field of Classification Search
CPC ......... B27B 25/00; B27B 25/02; B27B 25/08; B27B 25/10; B27B 3/14; B27B 3/16; B27B 5/065; B27B 31/00; B27B 31/003; B23D 47/04; B23D 47/042; B23D 47/045; B23D 47/047; B23D 51/04; B23D 51/043; B23D 51/046; Y10T 83/74; Y10T 83/741; Y10T 83/743; Y10T 83/744; Y10T 83/745; Y10T 83/747; B23Q 7/05; B23Q 7/055
USPC ......... 144/242.1, 246.1, 246.2, 248.2, 248.3, 144/248.4, 248.5, 248.6, 248.7
See application file for complete search history.

(56) References Cited

U.S. PATENT DOCUMENTS

| | | | |
|---|---|---|---|
| 4,212,214 A | 7/1980 | Bippus | |
| 4,483,378 A | 11/1984 | Chang et al. | |
| 4,528,881 A * | 7/1985 | Harris | ........... B26D 7/0675 144/242.1 |
| 4,875,512 A | 10/1989 | Lin | |
| 4,989,653 A * | 2/1991 | Angus | ........... B23C 3/12 144/117.3 |
| 5,123,464 A | 6/1992 | Van Gelder | |
| 5,247,977 A * | 9/1993 | Munsey | ........... B27L 1/10 144/208.1 |
| 5,904,192 A | 5/1999 | Chen | |

(Continued)

FOREIGN PATENT DOCUMENTS

| | | |
|---|---|---|
| CN | 2031342 U | 1/1989 |
| CN | 2629934 Y | 8/2004 |

(Continued)

*Primary Examiner* — Matthew G Katcoff
(74) *Attorney, Agent, or Firm* — Alan D. Kamrath; Kamrath IP Lawfirm, P.A.

(57) ABSTRACT

A safety feeder includes a transmission system including a drive shaft having a rotating axis on a phantom axis, and a coupling system connecting to the drive shaft and configured to rotate with the drive shaft simultaneously. The coupling system includes a drive line and a tube covering the drive line. The drive line includes an end thereof connecting to the drive axle.

18 Claims, 9 Drawing Sheets

(56) References Cited

U.S. PATENT DOCUMENTS

| | | |
|---|---|---|
| 7,730,914 B2 | 6/2010 | Lin |
| 8,371,198 B2 | 2/2013 | Babine |
| 8,931,528 B2 * | 1/2015 | Hsiung ................ B27B 25/10 144/242.1 |
| 2009/0049969 A1 | 2/2009 | Lin |
| 2014/0360627 A1 | 12/2014 | Sung |

FOREIGN PATENT DOCUMENTS

| | | |
|---|---|---|
| CN | 2754844 Y | 2/2006 |
| CN | 201168988 Y | 12/2008 |
| CN | 202045691 U | 11/2011 |
| DE | 3423630 A1 | 1/1986 |
| DE | 3708341 A1 | 9/1988 |
| JP | S55112746 A | 8/1980 |
| JP | H07223202 A | 8/1995 |
| SU | 721328 A1 | 3/1980 |
| TW | 243747 | 3/1995 |
| TW | 392571 U | 6/2000 |

\* cited by examiner

SAFETY FEEDER

CROSS REFERENCE TO RELATED APPLICATION

The present application is a continuation application of U.S. patent application Ser. No. 14/289,696 filed on Jun. 29, 2014, of which the disclosure is incorporated herein.

BACKGROUND OF THE INVENTION

1. Field of the Invention

The present invention relates to a safety feeder and, more particularly, to a safety feeder including two pressing rollers disposed apart and adapted to be arranged differently, and being usable with different woodworking machines.

2. Description of the Related Art

There are various types of woodworking machines nowadays, for examples, wood planers and wood sawing machines. Planning and sawing are basic woodworking operations. Planing is used to produce horizontal, vertical, or inclined flat surfaces on wood workpieces. Sawing is used to cut wood workpieces. In addition, a feeder is used with a woodworking machine to feed a wood workpiece into the woodworking machine. Likewise, the feeder types are various and a feeder suitable for one type of woodworking machine may not be suitable for another type of woodworking machines. However, it is costly to use different feeders for different woodworking machines.

A conventional feeder includes pressing rollers disposed in one row, and, therefore, disposed on one side of a cutter of a woodworking machine when feeding a wood work piece to the woodworking machine. The pressing rollers will press the wood workpiece against a platform and rotate to convey the wood work piece. However, the pressing rollers are only able to press against one of cut halves of the wood workpiece. As a result, the half of the wood work piece that is not pressed by the pressing rollers needs to be conveyed by an exterior force. In addition, it is noted that the halves of the wood workpiece need to be conveyed simultaneously in order to allow the cutter to stably cut the wood workpiece and produce an accurate cut. In this regard, manually pushing the wood workpieces is hazardous.

U.S. patent application Ser. No. 14/289,696 teaches a feeder that overcomes the problem set forth. Nevertheless, the safety feeder and the woodworking machine are powered independently. Therefore, it is desired that the safety feeder and the woodworking machine are power simultaneously and automatically, which can save efforts to power the safety feeder and the woodworking machine independently.

The present invention is, therefore, intended to obviate or at least alleviate the problems encountered in the prior art.

SUMMARY OF THE INVENTION

According to the present invention, a safety feeder includes a transmission system including a drive shaft having a rotating axis on a phantom axis, and a coupling system connecting to the drive shaft and configured to rotate with the drive shaft simultaneously. The coupling system includes a drive line and a tube covering the drive line. The drive line includes an end thereof connecting to the drive axle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a safety feeder usable with a woodworking machine such that the safety feeder can feed a workpiece to the woodworking machine and enable the woodworking machine to process the workpiece precisely.

It is another object of the present invention to provide a safety feeder usable with different woodworking machines.

It is a further object of the present invention to provide a power-driven safety feeder connectable to a woodworking machine such that the woodworking machine can power the safety feeder.

Other objects, advantages, and new features of the present invention will become apparent from the following detailed description of the invention when considered in conjunction with the accompanied drawings.

DETAILED DESCRIPTION OF THE INVENTION

Figure 1:
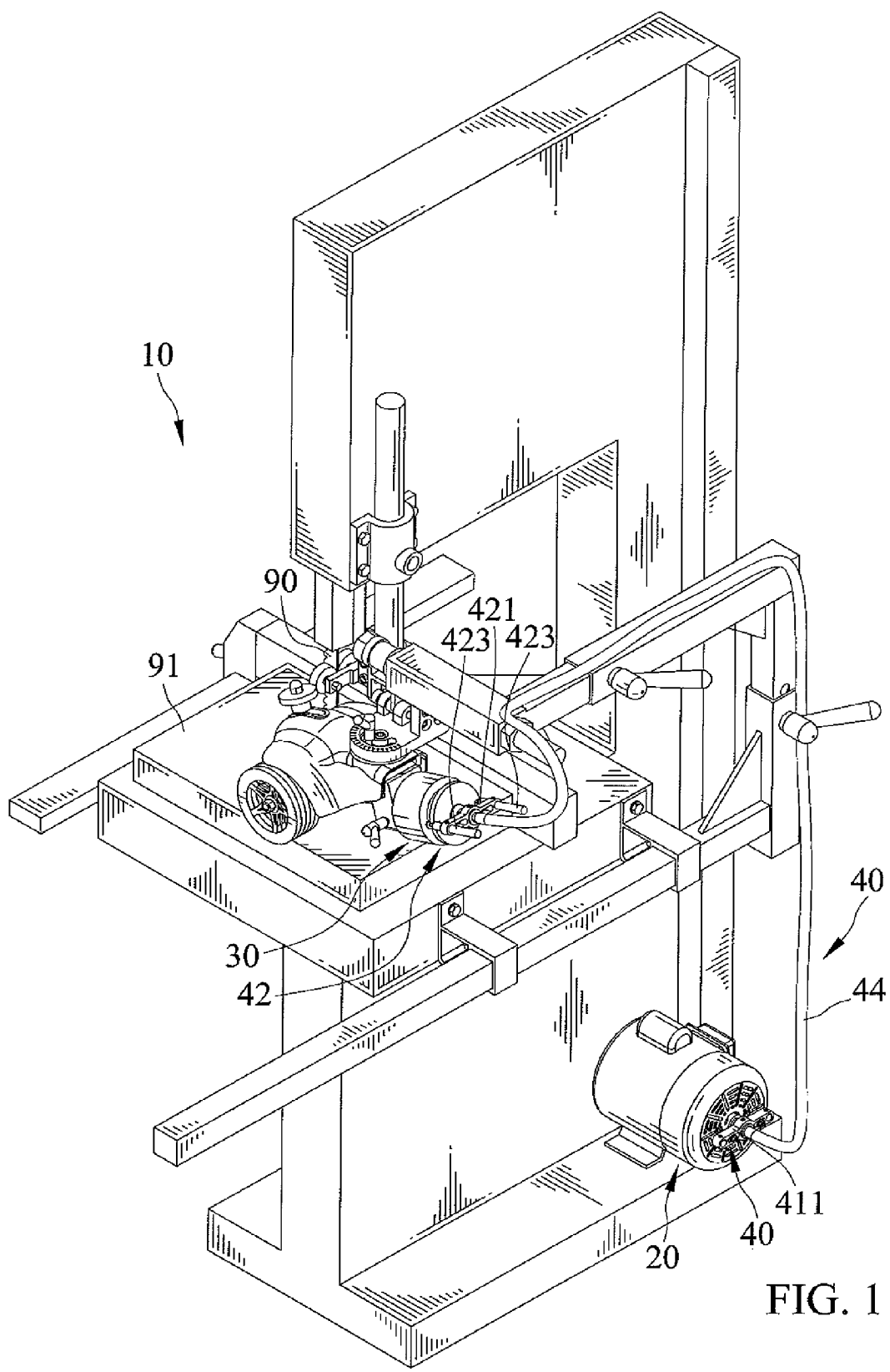
FIG. 1 is a perspective view showing a safety feeder in accordance with a first embodiment of the present invention connected to a woodworking machine.
Figure 2:
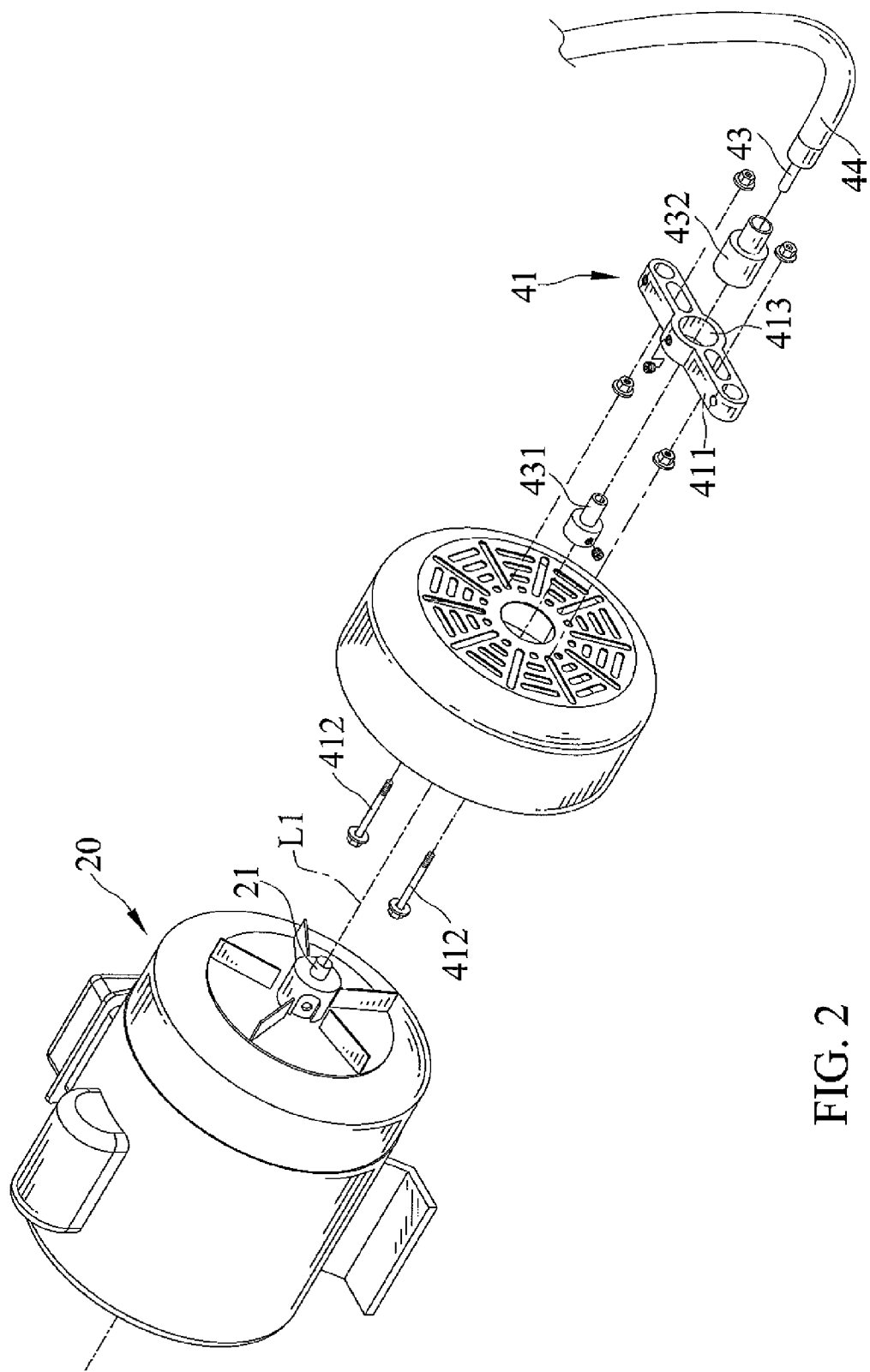
FIG. 2 is a partial exploded perspective view of FIG. 1, illustrating the connection between the safety feeder and a power source of the woodworking machine.
Figure 3:
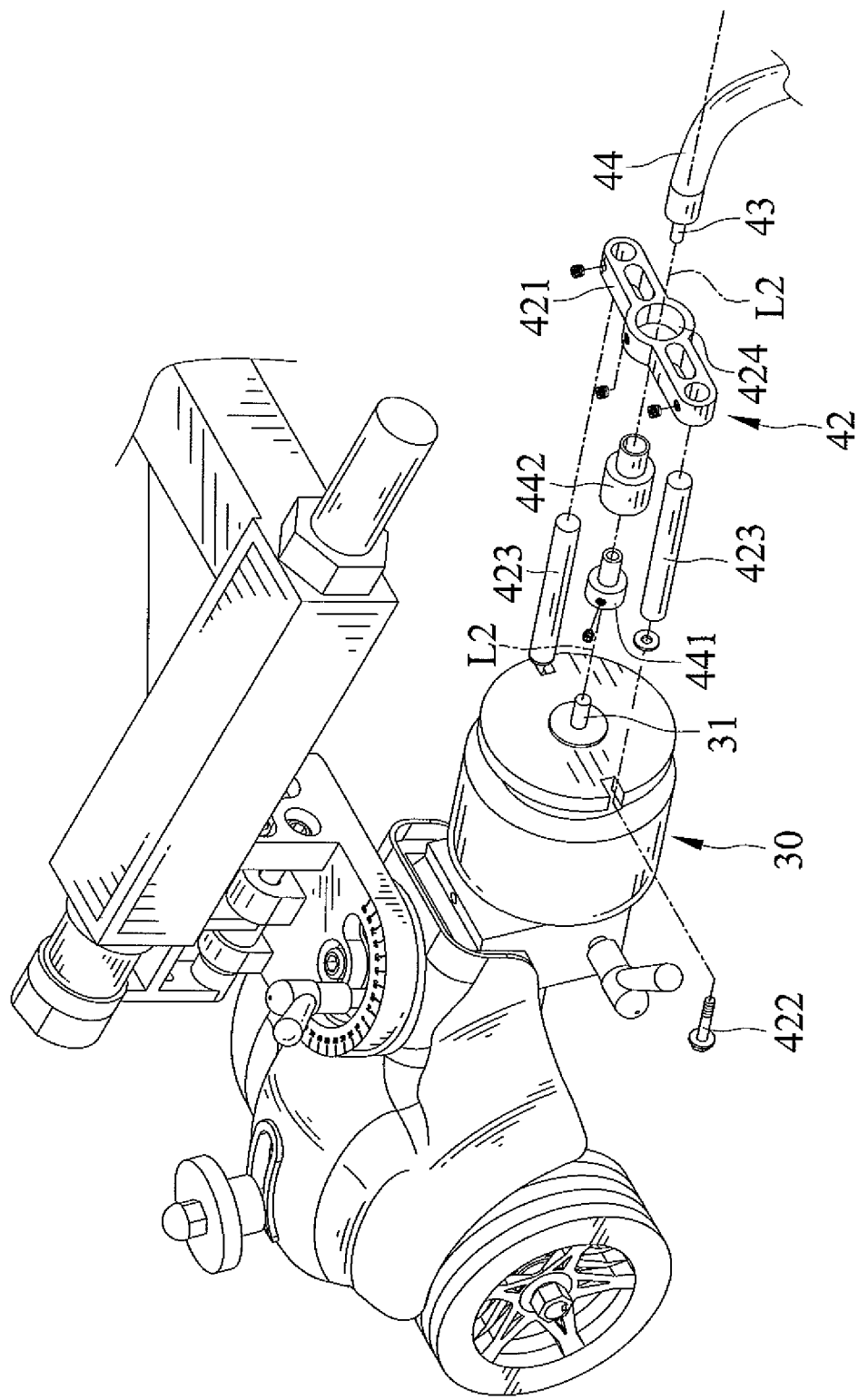
FIG. 3 is a partial exploded perspective view of the safety feeder of first embodiment.
Figure 4:
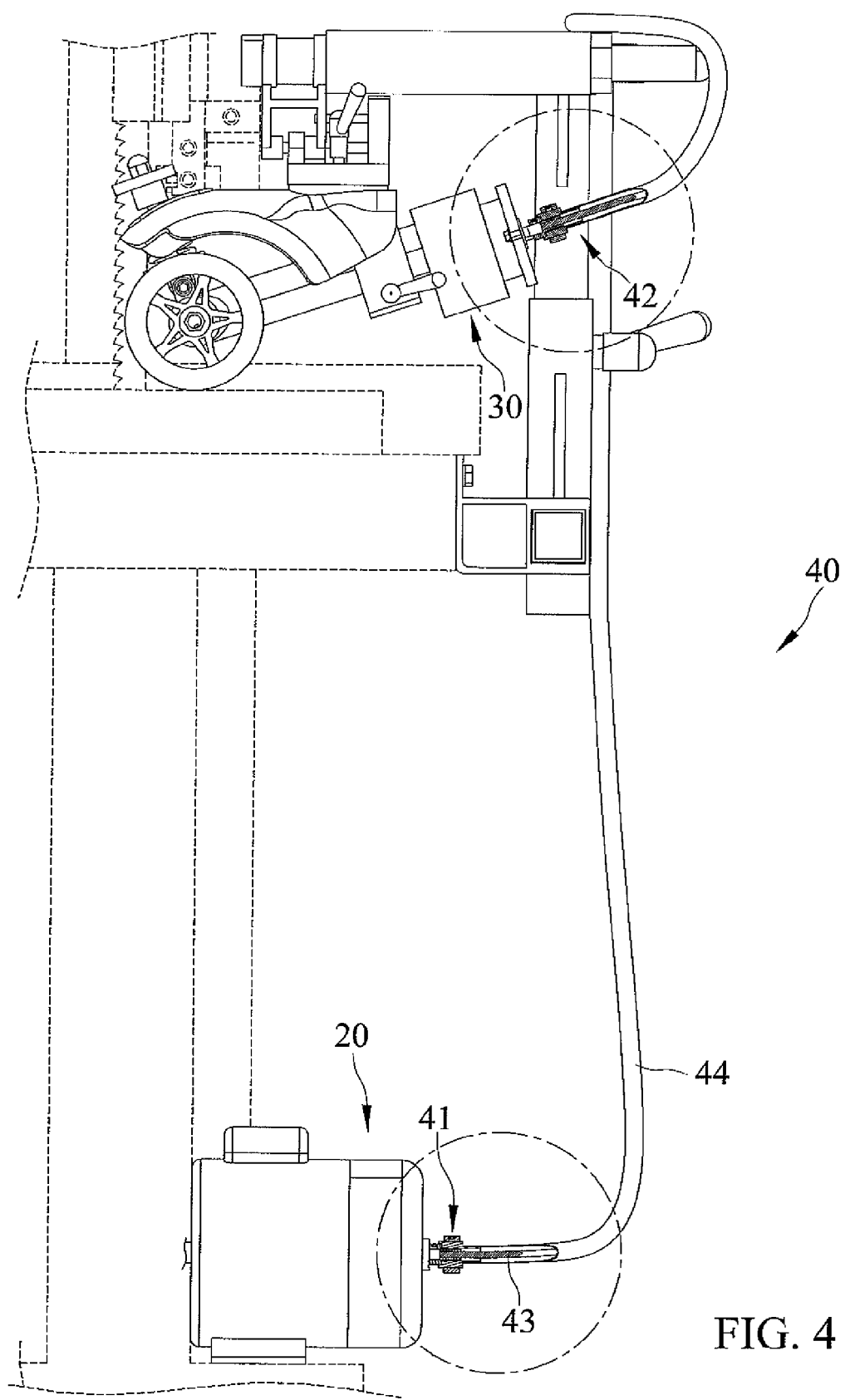
FIG. 4 is a partial cross-sectional side view of FIG. 1.
Figure 5:
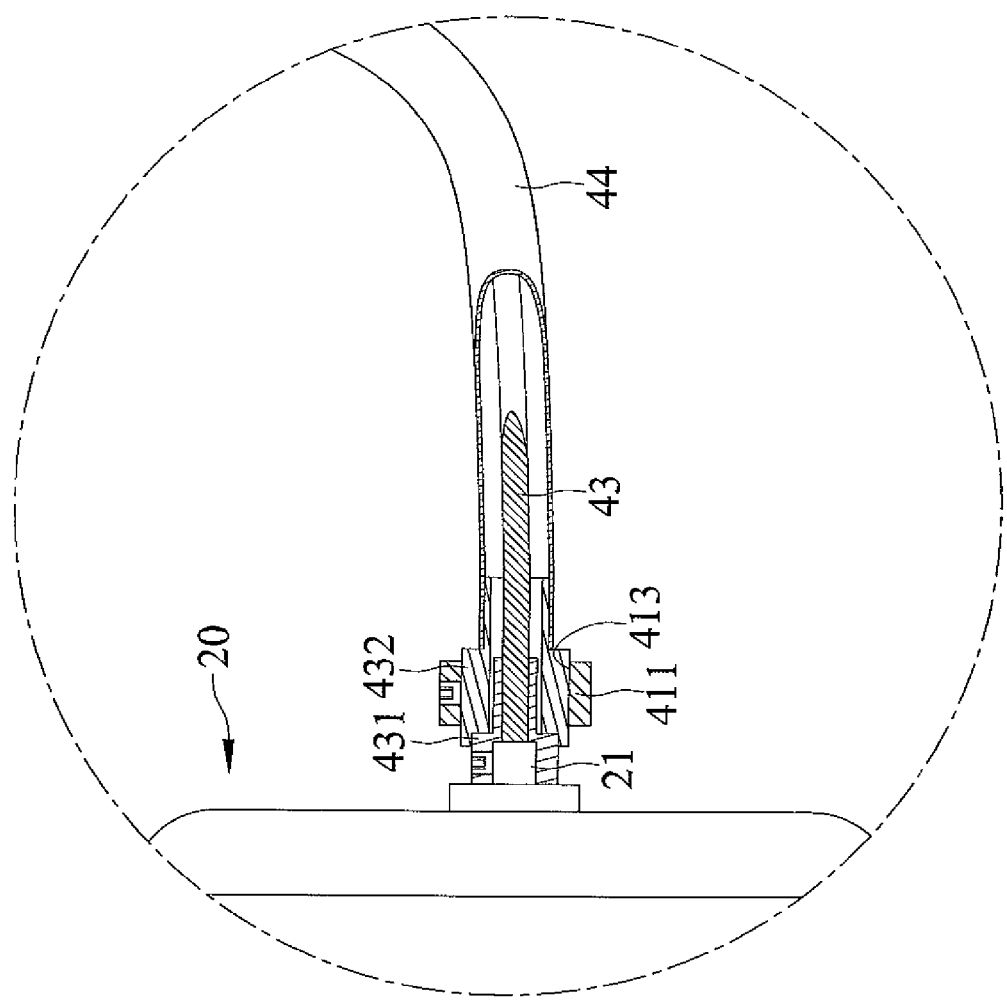
FIG. 5 is an enlarged view of FIG. 4, showing the connection between the safety feeder and the power source.
Figure 6:
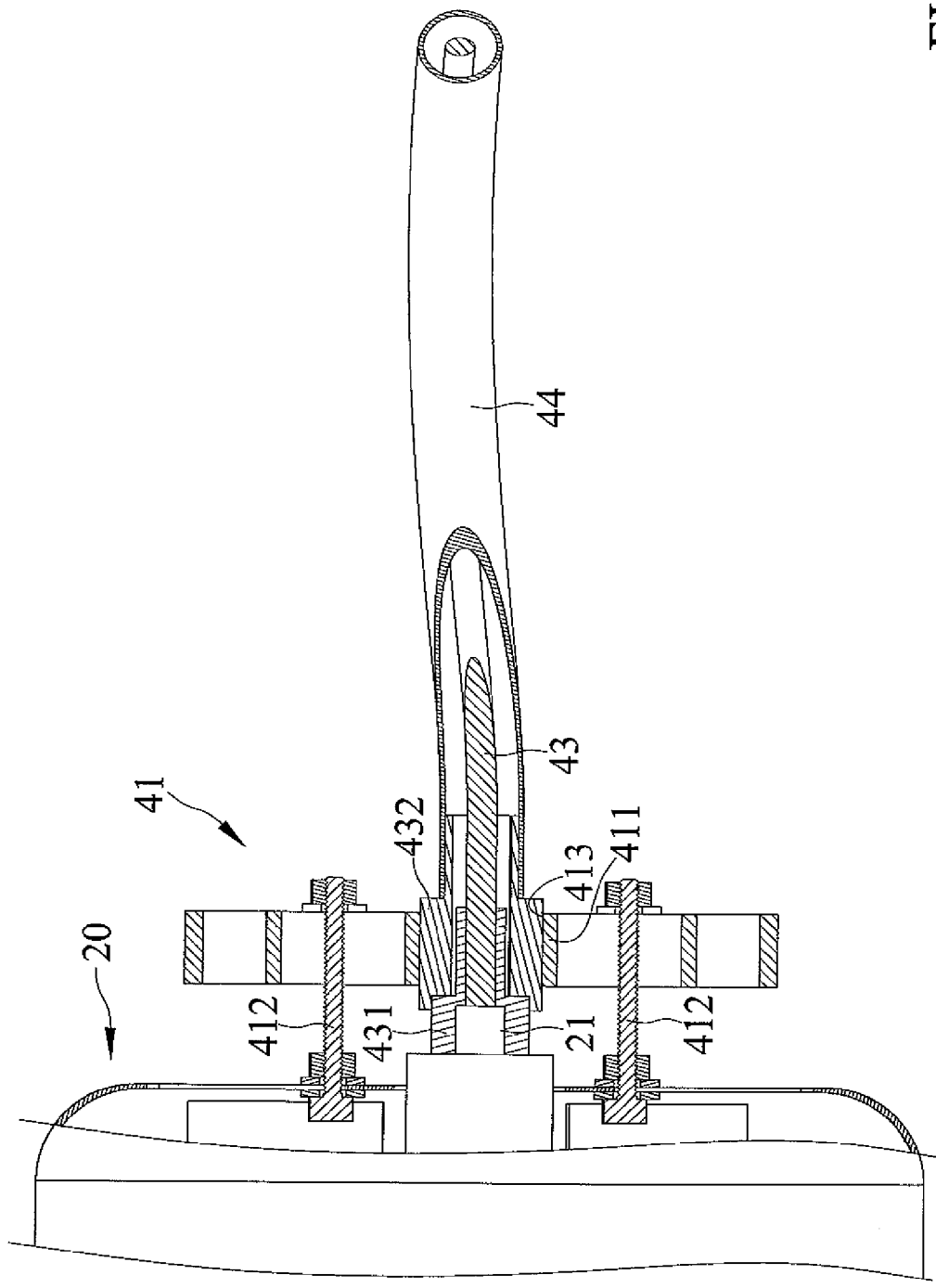
FIG. 6 is a partial cross-sectional view of FIG. 1, showing the connection between the safety feeder and the power source.
Figure 7:
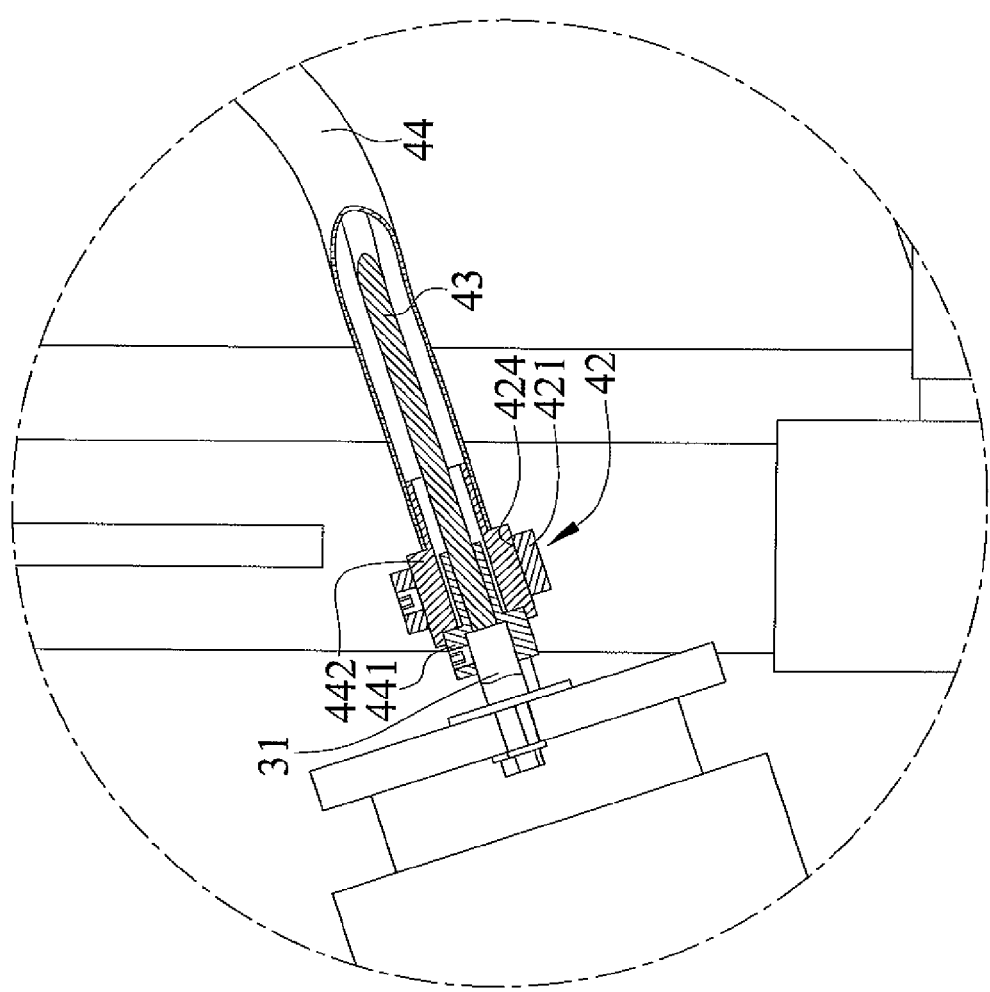
FIG. 7 is another enlarged view of FIG. 4.
Figure 8:
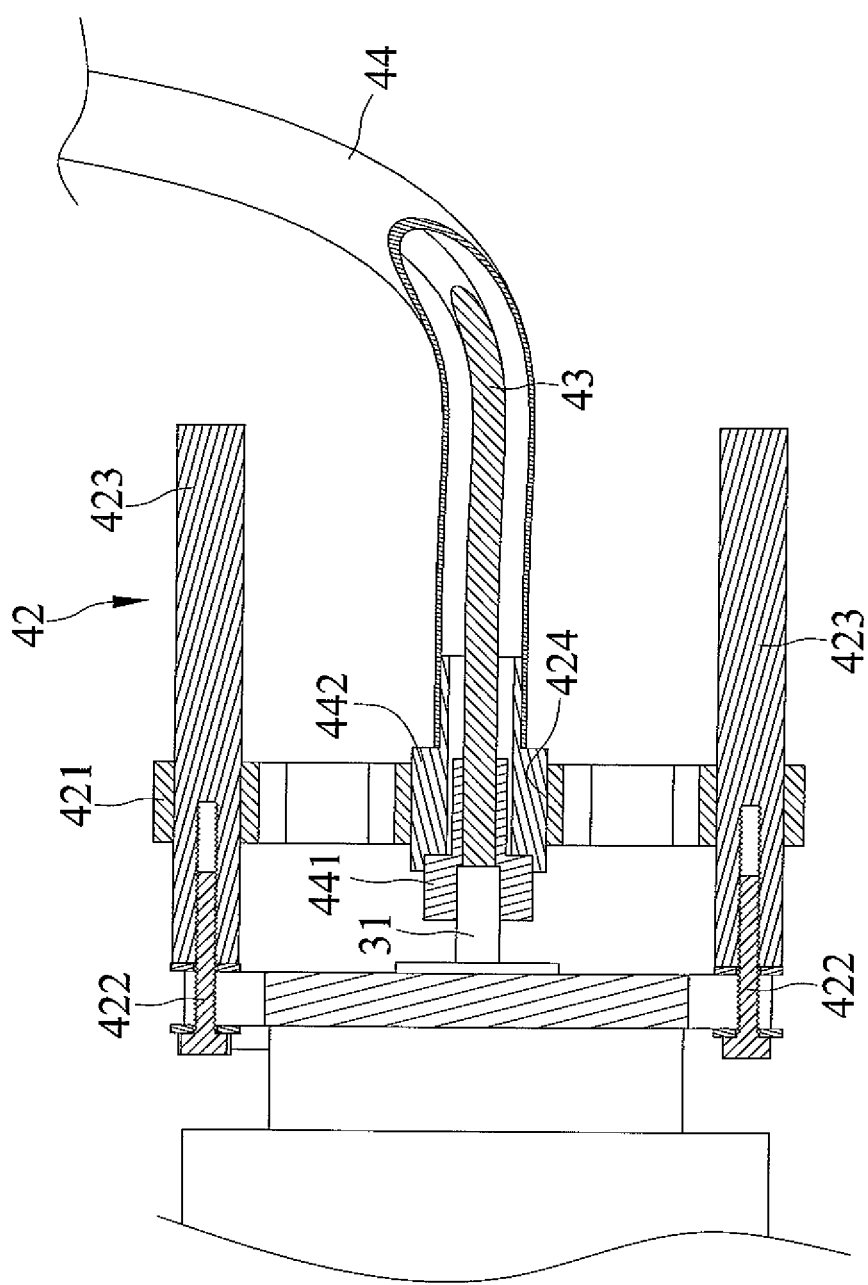
FIG. 8 is a partial cross-sectional view of the safety feeder of the first embodiment.

FIGS. 1 through 8 show a safety feeder usable with different woodworking machines in accordance with a first embodiment of the present invention. The safety feeder is connected to a woodworking machine 10. The woodworking machine 10 includes a cutter. The cutter is a band saw 90. The woodworking machine 10 includes a power source 20 and a cutter for processing a workpiece 91 adapted to be driven by the power source 20. The power source 20 is a motor, which includes a rotating drive axle 21. The drive axle 21 rotates about a first phantom axis L1.

The safety feeder is craned by a fixing frame. The fixing frame is releasably mounted on the woodworking machine 10. The safety feeder is joined to the fixing frame. The fixing frame is telescopically extendable and includes a plurality of beams telescopically connected with each other. The fixing frame includes at least one of the plurality of beams releasably supported by at least one bracket, which is adapted to be mounted on the woodworking machine 10. The fixing frame includes at least two of the plurality of beams connected telescopically and movable relative to each other in a first direction which affects a vertical position of the safety feeder with respect to the woodworking machine 10. The fixing frame includes at least two of the plurality of beams connected telescopically and movable relative to each other in a second direction which affects a horizontal position of the safety feeder with respect to the woodworking machine 10. The safety feeder is pivotally positionable at a fixed pivoting position with respect to the fixing frame. The fixing frame and safety feeder include a pivot joint connecting therewith. The pivot joint includes a first pivot joint pivotally engaging with the fixing frame and a second pivot joint pivotally engaging with the first pivot joint. A first pivot engages with the first and second pivot joints, and the first and second pivot joints are pivotal about the first pivot. A second pivot engages with the second pivot joint and the safety feeder, and the second pivot joint and the safety feeder are pivotal about the second pivot. The first pivot joint pivots with respect to the fixing frame in a first orientation. The second pivot joint pivots with respect to the first pivot joint in the first orientation. The safety feeder pivots with respect to the second pivot joint in a second orientation. The safety feeder can also pivot in the first orientation as the second joint can pivot with respect to the first pivot joint in the first orientation. The first pivot joint includes a first slot. The second pivot joint includes a second slot. A first locking member engages with the first and second pivot joint and inserts through the first slot. A second locking member engages with the second pivot joint and the safety feeder and inserts through the second slot. The first and second slots define two arcuate slots. The first locking member has a lock position in which the first and second pivot joints are at a fixed relative pivoting position and an unlock position in which the first and second pivot joints are pivotal relative to each other. The second locking member has a lock position in which the second pivot joint and the safety feeder are at a fixed relative pivoting position and an unlock position in which the second pivot joint and the safety feeder are pivotal relative to each other. The pivot joint has two scales. One scale indicates a pivoting position of the second pivot joint with respect to the first pivot joint. The other scale indicates a pivoting position of the safety feeder with respect to the second pivot joint.

The safety feeder includes a transmission system 30 and at least one first and second pressing rollers. The transmission system 30 and the at least one first and second pressing rollers are interconnected, and the at least one first and second pressing roller are rotated upon driving the transmission system 30. The transmission system 30 includes a rotating drive shaft 31 configured to cause the at least one first and second pressing rollers to turn. In addition, the transmission system 30 is configured to cause the at least one first and second pressing roller to turn simultaneously. When the drive shaft 31 rotates, it can transmit torque and rotation to cause the at least one first and second pressing rollers to turn simultaneously.

The safety feeder and the woodworking machine 10 are connectable together through a coupling system 40. The coupling system 40 is configured to cause the drive axle 21 to drive the drive shaft 31. The drive shaft 31 driven by the drive axle 21 rotates about a second phantom axis L2. The coupling system 40 includes a first mounting device 41, a second mounting device 42, and a drive line 43. The drive line 43 is attached to the first and second mounting devices 41 and 42. The drive line 43 is flexible. The first mounting devices 41 and 42 are disposed on opposite ends of the drive line 43. The first mounting device 41 is connectable to the power source 20. The second mounting device 42 is connectable to the safety feeder. The first mounting device 41 includes a fixture 411 adapted to be mounted on the power source 20 and at least one fastener 412 for securing the fixture 411. The at least one fastener 412 includes outer threads and engages with a retainer with mating inner threads. The retainer prevents the fastener 412 disengage from the fixture 411 and the power source 20. The fixture 411 is symmetrical. Two fasteners 412 are used to secure the fixture 411 on the power source 20 and arranged symmetrically, thereby securing the fixture 411 in a stable condition. The fixture 411 includes a extending through a center thereof. The center of the fixture 411 is disposed on the first phantom axis L1. The drive line 43 includes a first end thereof inserting through the through hole 413 and connects to the drive axle 21 such that the rotating drive axle 21 drives the drive line 43. A first joining device interconnects the first end of the drive line 43 and the drive axle 21 and is configured to allow the rotating drive axle 21 drives the drive line 43, as well as allow the drive line 43 and the fixture 411 attach together securely. The first joining device includes a sleeve 431 and a sleeve 432. The drive line 43 and the drive axle 21 are retained on opposite ends of the sleeve 431. The sleeve 432 is attached to and disposed outside the sleeve 431. The sleeve 432 is retained in peripheral engagement with the through hole 413. The sleeve 431 is rotatable relative to the sleeve 432. The second mounting device 42 includes a fixture 421 adapted to be mounted on the safety feeder and at least one fastener 422 for securing the fixture 421. The fixture 421 is symmetrical. Two fasteners 422 secure the fixture 421 on the safety feeder and arranged symmetrically, thereby securing the fixture 421 in a stable condition. The fixture 421 includes a through hole 424 extending through a center thereof. The center of the fixture 421 is disposed on the second phantom axis L2. The drive line 43 includes a second end thereof inserting through the through hole 424 and connects to the drive shaft 31 such that the rotating drive line 43 drives the drive shaft 31. A second joining device interconnects the second end of the drive line 43 and the drive shaft 31 and is configured to allow the rotating drive line 43 drives the drive shaft 31, as well as to allow the drive line 43 and the fixture 421 attach together securely. The second joining device includes a sleeve 441 and a sleeve 442. The second end of the drive line 43 and the drive shaft 31 are retained on opposite ends of the sleeve 441. The sleeve 442 is attached to and disposed outside the third sleeve 441. The sleeve 442 is retained in peripheral engagement with the through hole 424. The sleeve 441 is rotatable relative to the sleeve 442.

The second mounting device 42 further includes a strut 423 for securing the fixture 421 on the safety feeder. The strut 423 can also reduce vibrations of the drive line 43 and the drive shaft 31. The strut 423 is installed between the fixture 421 at the fastener 422. The strut 423 includes a first distal end thereof fixed to the fastener 422 and a second distal end thereof engaging in a cavity in the fixture 421. The at least one fastener 422 includes outer threads and engages with the first distal end of the strut 423 with mating inner threads. The second distal end of the strut 423 and the cavity have corresponding shapes and are meshed together. In addition, the fixture 421 is similar to the fixture 411. Although not shown, two struts similar to the struts 423 can also be used to securing the fixture 411 on the power source 20 as well as reduce vibrations of the drive axle 21 and the drive line 43. Likewise, each of the two struts includes a first distal end thereof engaging with the fastener 412 instead of the retainer, and includes a second distal end thereof engaging in a cavity in the fixture 411.

The coupling system 40 also includes a tube 44. The tube 44 receives and covers the drive line 43, and therefore, protects the drive line 43. The drive line 43 has a smaller diameter than the tube 44 and is rotatable relative to the tube 44. The tube 44 has two opposite ends and includes a first end thereof connecting to the first mounting device 41 and a second end thereof connecting to the second mounting device 42, respectively. The first end of the tube 44 is attached to an end of the second sleeve 432. The second of the tube 44 is attached to an end of the fourth sleeve 442. The tube 44 is flexible.

The transmission system 30 includes a wheel axle engaging with the drive shaft 31. The rotating drive shaft 31 drives the wheel axle. The drive shaft 31 turns the wheel axle. The drive shaft 31 and the wheel axle are arranged perpendicularly to each other. The drive shaft includes a first bevel gear and the wheel axle includes a second bevel gear engaging with the first bevel gear. The wheel axle interconnects the at least one first and second pressing rollers. The at least one first and second pressing rollers are disposed separately in an axial direction with a predetermined gap on the wheel axle. The at least one first and second pressing rollers are of the same configuration. The safety feeder includes a body shell that frames the at least one first and second pressing rollers. The body shell includes a groove extending therethrough. The groove is elongated. A suspension system interconnects the body shell and the wheel axle. The suspension system includes a retainer disposed outside the body shell.

Each of the at least one first and second pressing roller has a hub with two opposite side and includes a first side forming a recess and a second side forming a protrusion. The at least one first pressing roller includes a plurality of first pressing rollers engaging with the wheel axle. Adjacent two of the plurality of first pressing rollers has a first arrangement in which the two first pressing rollers overlap together without a gap and have circumferential edges combined and adjacent to each other, and a second arrangement in which the two first pressing rollers overlap together with a gap and have the circumferential edges separated with the gap. Adjacent two first pressing rollers in the first arrangement include one protrusion engaging in one recess. Adjacent two first pressing rollers in the second arrangement include the protrusions facing oppositely and abutting against each other.

Because adjacent two first pressing rollers in the second arrangement include the gap therebetween, the band saw 90 of the woodworking machine 10 can align between the two first pressing rollers. Therefore, the band saw 90 can cut the workpiece 91 between the adjacent two first pressing rollers, and one half of the workpiece 91 is pressed and pushed by one first pressing rollers and the other half of the workpiece 91 is pressed and pushed by the other first pressing rollers, respectively. Likewise, the at least one second pressing roller has two arrangements as the at least one first pressing roller.

Figure 9:
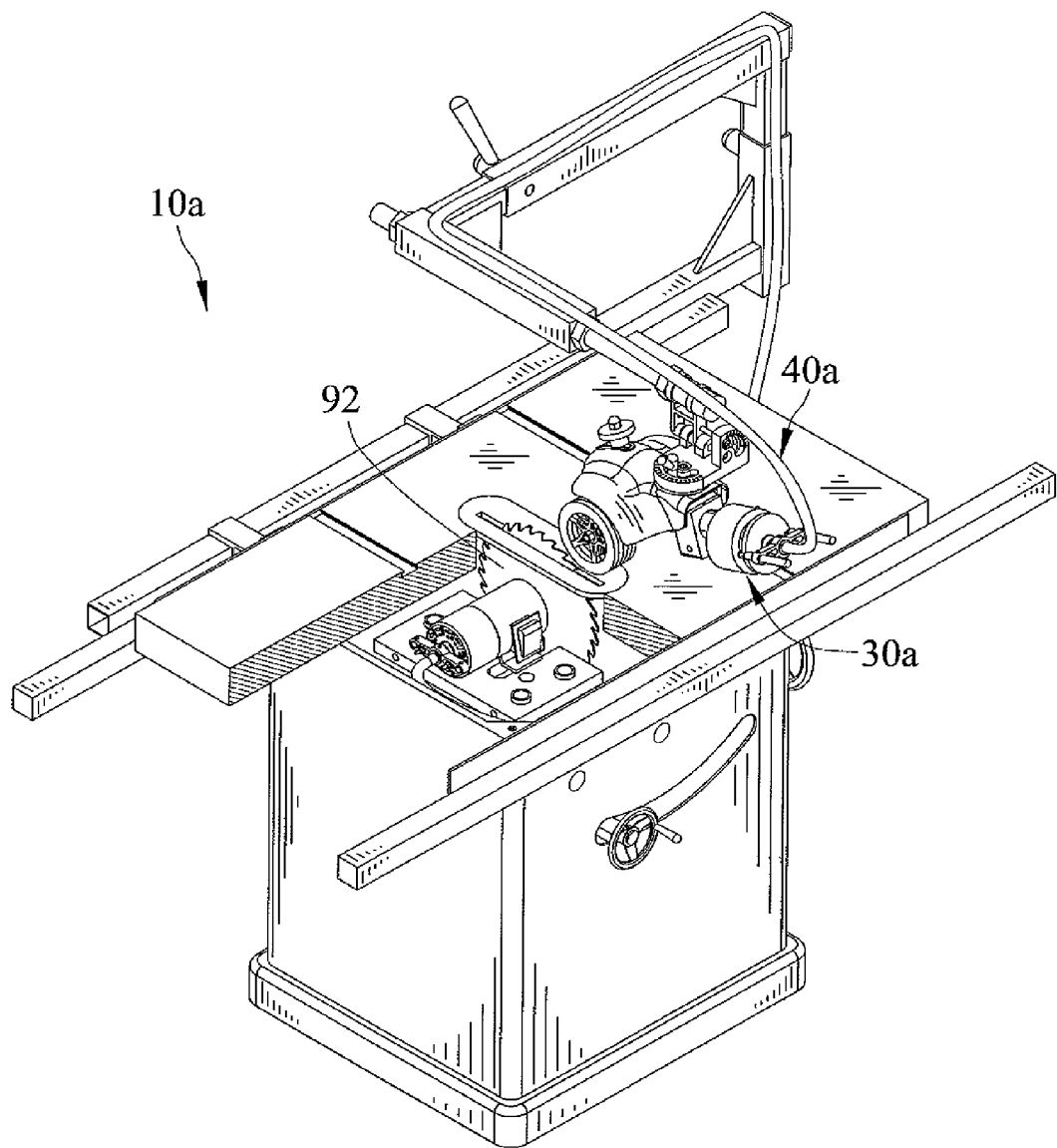
FIG. 9 is a perspective view showing a safety feeder in accordance with a second embodiment of the present invention connected to a different type of woodworking machine than that of FIG. 1.

FIG. 9 shows a safety feeder usable with different woodworking machines in accordance with a second embodiment of the present invention. The second embodiment is the same as first embodiment. The safety feeder of the second embodiment includes a transmission system 30a similar to the transmission system 30. The safety feeder is connected to a woodworking machine 10a through a coupling system 40a. The woodworking machine 10a has a cutter. The cutter is a circular saw 92. The coupling system 40a is similar to the coupling system 40.

In view of the forgoing, the safety feeder can feed the workpiece 91 to the woodworking machine 10 or 10a and enable the woodworking machine 10 and 10a to process the wood workpiece 91 precisely. Moreover, the safety feeder is usable with different woodworking machines 10 and 10a. Moreover, the safety feeder is power-driven and powered by the woodworking machine 10 or 10a. Consequently, the safety feeder and the woodworking machine 10 or 10a can operate simultaneously and automatically, and the safety feeder reduces costs of production and saves efforts to find a power source.

The foregoing is merely illustrative of the principles of this invention and various modifications can be made by those skilled in the art without departing from the scope and spirit of the invention.

What is claimed is:

1. A woodworking machine with a safety feeder, the woodworking machine having a power source with a drive axle configured to drive a cutter, with the drive axle having a rotating axis on a first phantom axis, and the safety feeder comprising:
    a transmission system including a drive shaft having a rotating axis on a second phantom axis;
    a coupling system interconnecting the drive axle and the drive shaft and configured to cause the drive axle and the drive shaft to rotate simultaneous, with the coupling system including a drive line, a first joining device with a first sleeve, a second joining device with a second sleeve, a first mounting device connected to the power source, and a second mounting device connected on the safety feeder, with the drive line including a first end thereof connecting to the drive axle and a second end thereof connecting to the drive axle, respectively, with a first end of the drive line and the drive axle are retained on opposite ends of the first sleeve, with a second end of the drive line and the drive shaft are retained on opposite ends of the second sleeve,
    with the first mounting device including a first fixture mounted on the power source and including a first through hole extending through a center of the first fixture, with the second mounting device including a second fixture mounted on the safety feeder and including a second through hole extending through a center of the second fixture,
with the first joining device including a third sleeve attached to and disposed outside the first sleeve and retained in peripheral engagement with the first through hole, with the first sleeve being rotatable relative to the third sleeve, with the second joining device including a fourth sleeve attached to and disposed outside the second sleeve and retained in peripheral engagement with the second through hole, and with the third sleeve being rotatable relative to the fourth sleeve.

2. The woodworking machine as claimed in claim 1, wherein the coupling system includes a tube covering the drive line, and wherein the tube includes a first end thereof connecting to the first mounting device and a second end thereof connecting to the second mounting device, respectively.

3. The woodworking machine as claimed in claim 2, wherein the first and second ends of the tube are attached to the third and fourth sleeve, respectively.

4. The woodworking machine as claimed in claim 1, wherein the first mounting device includes at least one first fastener securing the first fixture on the power source, wherein the second mounting device includes at least one second fastener securing the second fixture on the safety feeder.

5. The woodworking machine as claimed in claim 4, wherein the first mounting device includes two first fasteners arranged symmetrically, and wherein the second mounting device includes two fasteners arranged symmetrically.

6. The woodworking machine as claimed in claim 4, wherein the at least one first fastener includes outer threads and engages with a retainer with mating inner threads, and wherein the at least one second fastener includes outer threads and engages with a strut with mating inner threads.

7. The woodworking machine as claimed in claim 6, wherein the second mounting device includes the strut installed between the second fixture and the at least one second fastener, and wherein the strut includes a first distal end thereof fixed to the at least one second fastener a second distal end thereof engaging in a cavity in the second fixture.

8. The woodworking machine as claimed in claim 1, wherein the safety feeder is craned by a fixing frame, wherein the fixing frame is releasably mountable on the woodworking machine, wherein the safety feeder includes a wheel axle and at least one first and second pressing rollers interconnected by the wheel axle and disposed separately, and wherein the wheel axle is configured to be driven by the drive shaft.

9. The woodworking machine as claimed in claim 8, wherein the safety feeder includes a body shell and a suspension system interconnected between the body shell and the wheel axle.

10. A safety feeder comprising:
a transmission system including a drive shaft having a rotating axis on a phantom axis;
a coupling system connecting to the drive shaft and configured to rotate with the drive shaft simultaneously, with the coupling system including a drive line and, a first joining device with a first sleeve, a second joining device with a second sleeve, a first mounting device, and a second mounting device connected on the safety feeder, with the drive line including an end thereof connecting to the drive axle, with a first end of the drive line is retained on the first sleeve, with a second sleeve and a second end of the drive line is retained on the second sleeve, with the first mounting device including a first fixture and including a first through hole extending through a center of the first fixture, with the second mounting device including a second fixture mounted on the safety feeder and including a second through hole extending through a center of the second fixture, with the first joining device includes a third sleeve attached to and disposed outside the first sleeve and retained in peripheral engagement with the first through hole, with the first sleeve being rotatable relative to the third sleeve, with the second joining device including a fourth sleeve attached to and disposed outside the second sleeve and retained in peripheral engagement with the second through hole, and with the third sleeve being rotatable relative to the fourth sleeve.

11. The safety feeder as claimed in claim 10, wherein the coupling system includes a tube covering the drive line, and wherein the tube includes a first end thereof connecting to the first mounting device and a second end thereof connecting to the second mounting device, respectively.

12. The safety feeder as claimed in claim 11, wherein the first and second ends of the tube are attached to the third and fourth sleeve, respectively.

13. The safety feeder as claimed in claim 10, wherein the first mounting device includes at least one first fastener, wherein the second mounting device includes at least one second fastener securing the second fixture on the safety feeder.

14. The safety feeder as claimed in claim 13, wherein the first mounting device includes two first fasteners arranged symmetrically, and wherein the second mounting device includes two fasteners arranged symmetrically.

15. The safety feeder as claimed in claim 13, wherein the at least one first fastener includes outer threads and engages with a retainer with mating inner threads, and wherein the at least one second fastener includes outer threads and engages with a strut with mating inner threads.

16. The safety feeder as claimed in claim 15, wherein the second mounting device includes the strut installed between the second fixture and the at least one second fastener, and wherein the strut includes a first distal end thereof fixed to the at least one second fastener a second distal end thereof engaging in a cavity in the second fixture.

17. The safety feeder as claimed in claim 10, wherein the safety feeder is craned by a fixing frame, wherein the safety feeder includes a wheel axle and at least one first and second pressing rollers interconnected by the wheel axle and disposed separately, and wherein the wheel axle is configured to be driven by the drive shaft.

18. The safety feeder as claimed in claim 17, wherein the safety feeder includes a body shell and a suspension system interconnected between the body shell and the wheel axle.

* * * * *